United States Patent [19]

Repp

[11] 4,200,895
[45] Apr. 29, 1980

[54] SCANNING HEAD STRUCTURE FOR WIDE BAND MAGNETIC RECORD/REPRODUCING TAPE AND METHOD OF ITS MANUFACTURE

[75] Inventor: Arno Repp, Darmstadt, Fed. Rep. of Germany

[73] Assignee: Robert Bosch GmbH, Stuttgart, Fed. Rep. of Germany

[21] Appl. No.: 889,236

[22] Filed: Mar. 23, 1978

[30] Foreign Application Priority Data

Mar. 28, 1977 [DE] Fed. Rep. of Germany ....... 2713582

[51] Int. Cl.² .................. G11B 5/52; G11B 15/60
[52] U.S. Cl. .................. 360/107; 360/84; 360/130.23; 360/130.32
[58] Field of Search .................. 360/107, 84–85, 360/130, 130.2–130.23, 130.31, 130.32

[56] References Cited
U.S. PATENT DOCUMENTS

| | | | |
|---|---|---|---|
| 3,516,146 | 6/1970 | Maxey | 360/130.24 |
| 3,679,840 | 7/1972 | Maxey | 360/130 |
| 4,032,986 | 6/1977 | Prochnow | 360/130 |
| 4,050,090 | 9/1977 | Kollar | 360/130 |

OTHER PUBLICATIONS

IEEE Spectrum, Don Mennie, Consumers as Programmers, Jan., 1978, pp. 54–55.

Primary Examiner—Alfred H. Eddleman
Attorney, Agent, or Firm—Frishauf, Holtz, Goodman & Woodward

[57] ABSTRACT

To provide for accurate relocation of two cylindrical halves of a scanning head after diassembly, for example for replacement of scanning transducers, a cylindrical element is located adjacent a support block having a surface approximately matching the surface of the cylindrical scanning head and additionally includes bearing seats formed of cast, or molded material in engagement with the cylindrical portions in positioning the portions on the support block; the cast or molded projection may, for example, be made of cured epoxy, cast through holes in the support block and prevented from adhesion with the cylindrical parts by a separating element.

24 Claims, 6 Drawing Figures

SCANNING HEAD STRUCTURE FOR WIDE BAND MAGNETIC RECORD/REPRODUCING TAPE AND METHOD OF ITS MANUFACTURE

Reference to related disclosure: DT-OS No. 1,930,779 to which U.S. Pat. Nos. 3,516,146 and 3,679,840 approximately correspond; and IEE "Spectrum", issue of January 1978 titled "Technology 1978", pages 54, 55.

The present invention relates to a scanning head structure for wide band magnetic recording/reproducing tape apparatus, and to a method of its manufacture, and more particularly to a scanning head structure which includes a cylindrical drum about which tape, such as ½" or 1" magnetic tape is guided in a spiral path.

BACKGROUND AND PRIOR ART

Various types of scanning arrangements in which comparatively wide band magnetic tape is guided in a spiral path have been proposed. The referenced German Disclosure Document DT-OS No. 1,930,779, the disclosure of which is hereby incorporated by reference, discloses such a scanning arrangement and a method to assemble the scanning structure. In accordance with this disclosure, a drum guide element is provided which guides a composite scanning drum in which a rotating head wheel is located, the head wheel carrying the transducer heads themselves. The attachment guide element for the block is formed with two highly precisely manufactured surfaces which cooperate with the external surfaces of the cylindrical tape guide head. After adjustment, the cylindrical half-elements of the tape head are separably connected to the guide block.

Magnetic tape for use in video tape recording uses a comparatively wide magnetic tape operating at comparatively slow speed, being scanned by one or more heads which operate at an angle with respect to the direction of movement of the tape. The information is thus stored on the tape in the sequence of parallel inclined tracks, carried at an angle with respect to an edge of the tape. An excellent discussion of such equipment is found in the IEE "Spectrum", issue of January 1978 titled "Technology 1978", pages 54, 55, section relating to VCR (video cassette recording). Various types of apparatus have also been proposed in which the magnetic tape is longitudinally deformed, over a minor section thereof to have the shape of the cylindrical surface in which a head wheel runs along the axis, so that the tape is scanned in a direction transverse to its longitudinal movement. The systems in which a tape is spirally guided over a cylindrical guide drum in a spiral path has several advantages. The video recording/playback head which actually causes the inclined track on the tape is guided to rotate in a narrow slit separating two halves of the cylindrical drum. One or more, usually two transducer heads are located on such a head wheel, operating within the slit between the half of the cylindrical guide drum over which the tape is spirally guided. The actual wrapping angle of the tape about the cylindrical head can vary between 90° and almost 360°. The angular position of the separate and tightly adjacent tracks with respect to the center axis of the tape thus can differ. The position and the angle of the tracks should be the same for all apparatus of one type, or model or system with only small tolerances if it is desired to permit interchange of magnetic tape made on one recorder for reproduction on another, or for use or re-recording on another without deterioration of quality. This is particularly important when recording and reproducing television signals in television studios. The accuracy of manufacture and assembly of the scanning system—the cylindrical guiding heads and the head wheel must thus be of highest order. The assembly of the two halves of the cylindrical guiding drum and the tape guide element, which determine the position of the tape on the drum is particularly difficult. The two halves of the guide drum have to be extremely accurate with respect to their geometric dimensions—with tolerances of only a few μm; further, the actual alignment both with respect to the direction of the axis, as well as with respect to the congruence of the axes of the halves must be practically perfect, so that errors of the drum half, after assembly, are essentially eliminated. When the magnetic tape is guided in transit from one half of the drum to the other it should not be subjected to any stresses, or changes in its geometric shape since such changes may result in a deviation of the scanning track from the predetermined ideal track.

The scanning heads or transducers in apparatus of this type, particularly for studio-type video recording/reproducing apparatus are subject to some wear, particularly due to the high scanning speed and the direct engagement of the scanning head with the tape. It is thus necessary to replace the scanning heads after several hundred operating hours, even when using the best heads available according to the present State of the Art. It is thus desirable that the head wheel operating in the separating gap or slit of the guide drum can be readily replaced after separating the guide drum halves from each other and that, after reassembly of the entire scanning system, the same accuracy of placement can be obtained as that originally provided. This reproduceability of location should be easily obtained and not require expensive machining, yet have the same positioning accuracy as the initial assembly of the elements with respect to each other.

THE INVENTION

It is an object to provide a scanning head structure, particularly for wide band magnetic reproducing/recording tape, such as is used, for example, in video tape recording (VTR) systems and particularly for high quality studio-type apparatus, in which the halves of the scanning drum can be readily disassembled, for exchange of the head wheel structure, and then again reassembled without requiring extensive and difficult adjustment, while retaining the accuracy of positioning which was initially built into the machine. The final structure, and the method of its manufacture and assembly should additionally be so arranged that the expense of reassembly is small while still permitting placement of the reassembled halves of the scanning drum with reproducible accuracy corresponding essentially to the initial accuracy of manufacture.

Briefly, a support block is provided which has a surface facing the drum and approximately matching the drum surface. Bearing seats are formed in the drum surface as hardened cast, or molded projections, made, for example, by a casting compound such as epoxy applied against the drum, after the drum has been treated with a separating medium to permit removal of the drum after the casting or molding compound has set or cured. The casting or molding projections thus come in engagements with the portions of the drum and will position the drum portions on the support block always in the same location. The block is formed with a sufficient number of openings through which the casting or molding compound is introduced to accurately determine the position of the cylindrical drum portions.

Drawings, illustrating a preferred example and used in explanation of the method of manufacture:

Figure 1:
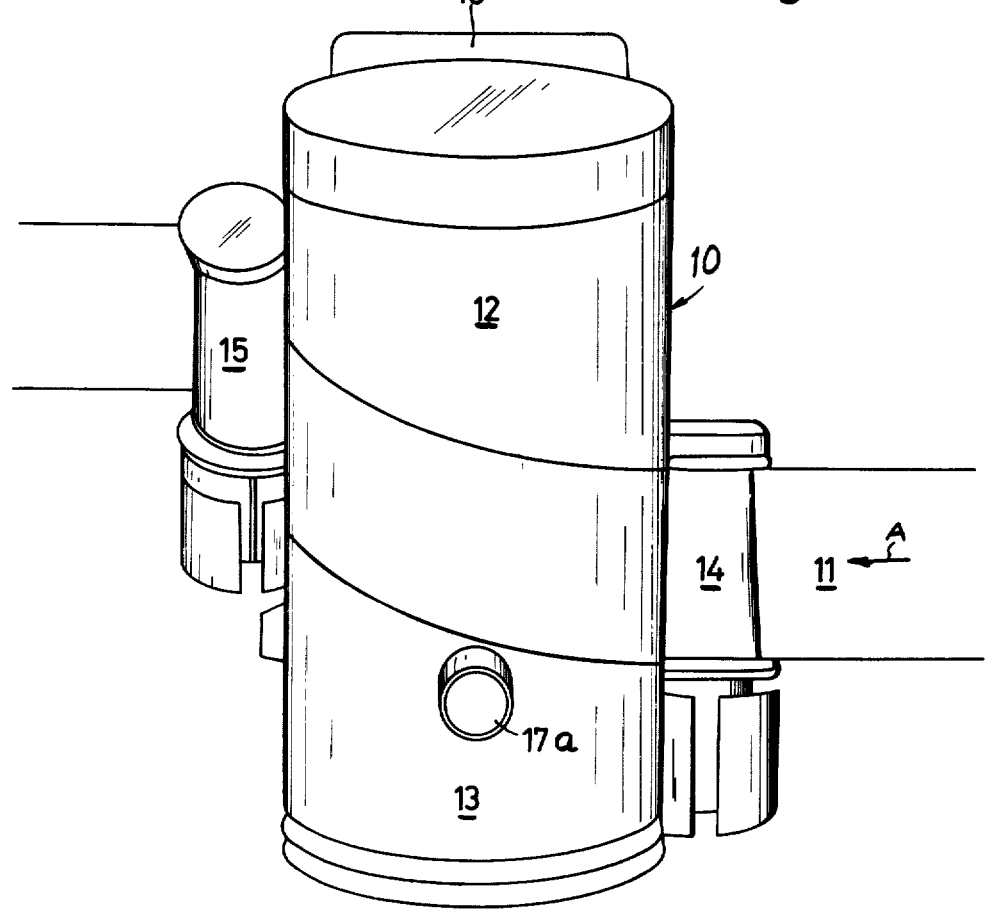
FIG. 1 is a perspective view of a scanning drum arrangement.

A tape 11 is spirally wrapped around a drum 10. The drum 10 consists of two drum parts or portions 12, 13. The wrapping angle is about 180°. Two tape guides, typically rollers having axes inclined with respect to the axis of the drum 10 are located adjacent the drum 10 to guide the tape 11, which may, for example, be 1" wide, about the circumference of the drum from a feeding guide roller 14 to the trailing or pull-off guide roller 15, the tape 11 moving in the direction of the arrow A.

The two halves 12, 13 of the drum are separated by a narrow gap, not seen in FIG. 1 in which a head wheel 10 rotates, carrying the tranducer heads. Usually, two transducer heads are located on the wheel. The portions 12, 13 are secured in an elongated drum carrier, or support block 16 to accurately position the parts 12, 13 with respect to each other and to secure the holder. A projecting stub 17a is used upon threading of the tape 11 about the drum; upon scanning it is no longer effective, being provided only to prevent slipping off of the unstretched tape upon initial threading.

Figure 2:
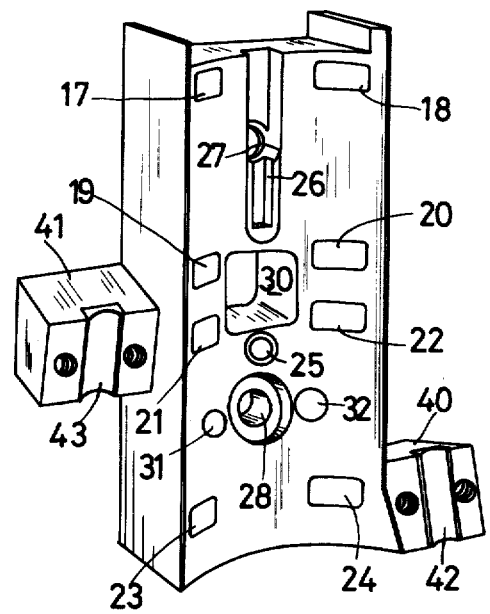
FIG. 2 is a perspective view of the support block from the drum side.
Figure 3:
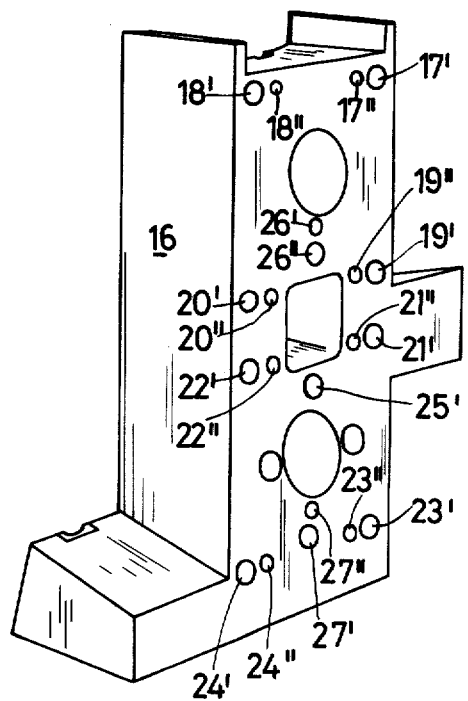
FIG. 3 is a perspective view of the support block from the rear side.

The elongated guide block 16 is best seen in FIGS. 2 and 3. It is, essentially, of rectangular aspect with one longitudinal side being shaped in the form of a hollow cylinder with a surface roughly matching the circumference of the drum 10. The block 16 is provided with a plurality of bearing seats 17, 18, 19, 20 and 21-24 to securely position the halves 12, 13 of the drum with respect to each other. The block 16 is preferably made of lightweight metal, such as aluminum or an aluminum alloy. The drum 16 is additionally formed with a specially sized or calibrated opening 25 and a guide slit 26 to permit alignment of the two drum parts. The block 16 is additionally formed with a calibrated bore—not visible in FIGS. 2 and 3—to align the entire assembly of the drum and the block 16 on the base plate of the magnetic tape recording apparatus. Bore 27 is used for the introduction of a bolt to secure the upper half or portion 12 of the drum 10. Bore 28 is used for the passage of a bolt to secure the lower part 13 to the block 16. The opening 30 and the two interior bores 31, 32 are used to receive various auxiliary apparatus which, however, are of no importance for the purposes of the present invention.

The two tape guide rollers 14, 15 (FIG. 1) are located adjacent the drum 10 and can have the axes or shafts secured to the same block 16. The axes of the tape guide rollers 14, 15 intersect in space. Their alignment is defined by a pair of lateral holders 40, 41 which have bearing sleeves 42, 43 cast, or otherwise secured therein. The bearing sleeves 42, 43 define the alignment of the shafts, or axes of the guide rollers 14, 15 in space and with respect to the drum 10. The level of the holders 40, 41 with respect to the drum 10 is so selected that the tape will pass about the drum in a spiral path, without stressing the longitudinal edges of the tape. The shafts of the tape guide roller 14, 15 are secured in the bearing sleeve halves 42, 43 by suitable bearing blocks fitting against the projections 40, 41 and likewise secured with bearing-half portions. Thus, the alignment and position of the shafts for the rollers 14, 15 are determined with respect to the drum 10. The arrangement is preferably so made, for example with elongated attachment holes on the matching parts to permit accurate alignment and positioning of the rollers 14, 15 with respect to drum 10.

Each one of the bearing seats 17-24, bore 25 and guide slit 26 are associated with corresponding fill bores 17' to 24' and vent bores 17'' to 24''. The side elements 40, 41 can likewise be formed with casting openings and vent and fill bores to cast the half bearing sleeves 42, 43. A filling bore 27' and vent bore 27'' is additionally provided for the bore 27.

Figure 5:
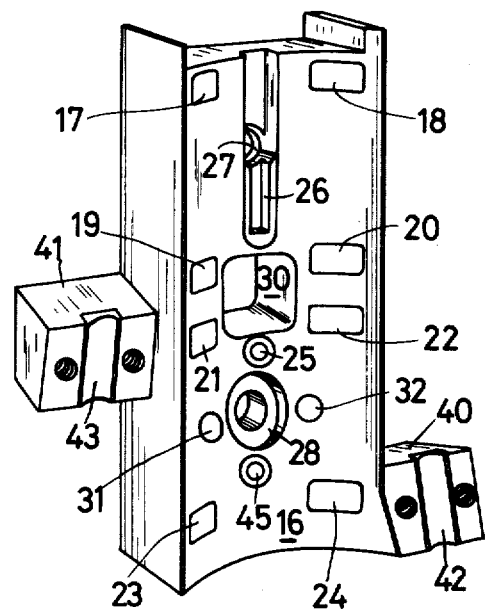
FIG. 5 is a perspective view of the support block illustrating another embodiment, from the drum side.
Figure 6:
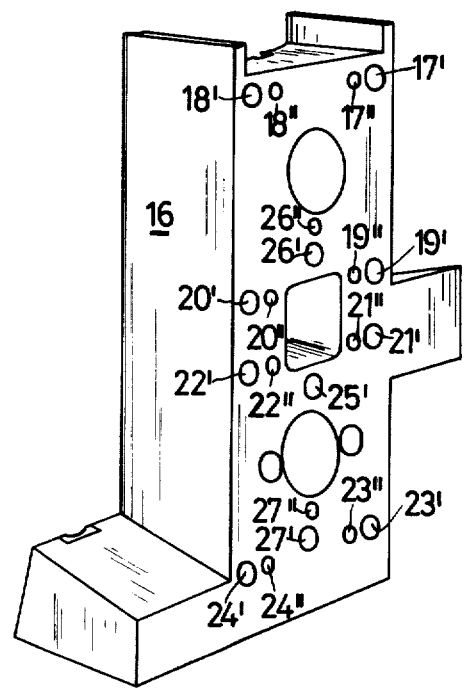
FIG. 6 is a perspective view of the rear side of the block of FIG. 5.

The arrangement of FIGS. 5 and 6 is similar; to determine the position of the drum 10, however, an additional calibrated bore 45 is provided in which a suitable correspondingly shaped pin formed on the lower guide drum part 13 can engage. It has been found that the arrangement of a second bore in the guide block 16 to determine the position of at least one of the halves of the drum 10, preferably of the lower half 13 can effectively counteract any tendency to assume an inclined position.

Figure 4:
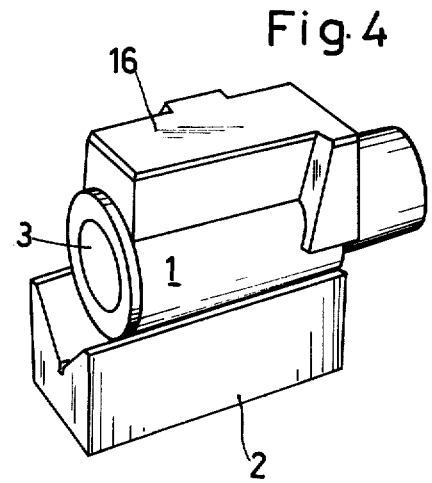
FIG. 4 is a perspective view of the support block, with a drum, and a dye to make the support block locations.

Method of manufacturing the bearing seats, for the aligned drum 10: A guide 2 (FIG. 4) with a prismatic, double converging V-shaped surface is used to locate a highly accurately made cylinder 1, having a diameter which corresponds to the diameter of the drum 10, that is, both its parts 12, 13. This cylinder 1, highly accurately made is placed on the guide 2. The guide block 16 is initially mechanically worked to provide a surface which approximately matches that of the cylinder 1. The bores and other surface features of the block 16 are then made. No surface of the block 16 requires high precision, or particularly good surface quality, or a polished appearance. The hollow cylindrical surface which is to receive the portions 12, 13 likewise need not be made very accurately. The surface is then covered with a well-known plastic, self-adhesive foil of about 0.2 mm thickness. The foil is removed from the positions 21-26. Cores are inserted in the bore 25 and, if the embodiment of FIGS. 5 and 6 is used, also into the bore 45. The guide slit 26, likewise, has a core inserted therein and rigidly connected to the cylinder 1. The cores, as well as the cylinder, are coated with a separating medium. The cylinder 1 which, to provide for weight reduction, may be hollow is then located on the guide or die 2 as seen in FIG. 4. It is clamped in the die 2 with slight pressure, just sufficient to secure it in position but insufficient to cause any measurable deformations on the cylinder 1 or on the die block 16. Clamping of the cylinder 1 and the guide block 16, and clamp arrangement is not shown and has been omitted. Any suitable clamps can be used, for example spring loaded. The fill openings 17' to 27' then have an artificial resin mixture introduced therein. The resin is in flowable condition and is introduced into the opening 17' to 27' until material of the mixture begins to escape from the vent bores 17″ to 27″ leaving, upon hardening, button-like projections 17-24 which form the seats for the cylinder. The bearing sleeves 42, 43 of the attachment 40, 41 are similarly cast. The resin mixture is so selected that it does not shrink, nor expand upon hardening. The block 16 is removed from the cylinder 1 after curing or hardening of the resin introduced into the openings 17′ to 27′. The foil can then be removed from the block 16 and the block 16 is ready to receive a guide drum, and ready for installation in a recording/reproducing apparatus.

A suitable resin is epoxy, and particularly of the type: Araldit CY 230 from CIBA/Geigy, Wehr, Western Germany. This type of epoxy will set at room temperature upon addition of a curing agent type HY 956 from CIBA, without shrinkage or expansion. A filler, for example milled quartz can be added to the epoxy. Milled quartz of about 1900 mesh/sq.cm grain size is suitable. A mixing relationship of about 26% (by weight) epoxy resin and 74% (by weight) of such milled quartz is suitable; this range is not critical and a range of up to 80% of filler material can be used, sufficient epoxy being required, however, to bind the milled quartz particle securely together. Other suitable fillers are:

Other suitable resins are: Araldit AW 106/Curing agent HV 953 U, both from Fischer, Bühl/Baden, Western Germany; Araldit AY 103/Curing agent HY 956, Giessharz M/Curing agent HY 956, all of CIBA/Geigy, Wehr/Baden, W. Germany. A suitable separating medium to prevent adhesion of the casting compound, that is, epoxy, for example, on the cylinder 1 is: Silicon oil.

Various changes and modifications may be made within the scope of the inventive concept.

I claim:

1. Scanning head structure for wide band magnetic recording/reproducing tape (11), particularly for video tape recording having
a stationary cylindrical guide drum (10) formed with two cylindrical portions (12, 13) axially separated by a gap and means (14, 15) guiding the tape about a portion of the circumference of said drum in a spiral path, said drum being adapted to have a transducer head wheel rotatable therein in a plane transverse to the axis of the cylindrical drum to scan an inclined path across the tape as the tape moves over the drum; and
a block-like support structure (16) separable from said drum located adjacent a portion of the surface of the drum extending axially alongside the drum and positioning the portions (12, 13) of the drum with respect to each other and having a surface facing the drum which approximately matches the drum surface, said structure being formed with openings extending therethrough and terminating at the surface thereof facing the guide drum (10);
and bearing seats (17, 18, 19, 20; 21, 22, 23, 24) comprising a hardened cast, or molded material located in said openings, projecting from the surface of the block-like structure facing the drum and in engagement with the portions (12, 13) of the drum and accurately positioning said portions on and with respect to the block-like structure (16).

2. Structure according to claim 1 further comprising bearing blocks (40, 41) attached to said block-like structure (16) to provide bearings for the tape guide means (14, 15);
and bearing sleeves (42, 43) comprising cast, or molded material in said bearing blocks.

3. Structure according to claim 1 wherein the cast, or molded material comprises a hardened, or cured resin.

4. Structure according to claim 3 wherein the hardened, or cured resin is an epoxy resin.

5. Structure according to claim 4 wherein the epoxy resin is curable, upon addition of a curing agent, at room temperature.

6. Structure according to claim 3 wherein the resin includes a filler material.

7. Structure according to claim 6 wherein the filler material includes milled quartz.

8. Structure according to claim 7 wherein the proportion of milled quartz to resin is, by weight, approximately 26% resin and 74% milled quartz.

9. Structure according to claim 1 wherein said block-like structure is made of a lightweight metal.

10. Structure according to claim 1 wherein said bearing seats are formed as button-like projections extending at discrete positions slightly outside of said surface on the block-like structure facing the drum.

11. Structure according to claim 1, wherein said block-like structure (16) is made of light-weight metal and the cast or molded material comprises a hardened, or cured resin which is dimensionally stable upon setting or curing and is essentially immune with respect to shrinking or expansion upon curing.

12. Structure according to claim 11, wherein the resin includes a filler material.

13. Method of making a scanning head structure for wide band magnetic recording/reproducing tape (11), particularly for video tape recording, having
an essentially cylindrical drum (10) and a block-like support structure (16) on which the drum is to be secured in accurately positioned relation, the structure having a surface facing the essentially cylindrical drum and approximately matching the cylindrical surface of the drum,
comprising the steps of
forming a plurality of openings (17′-24′) extending through said block-like structure and terminating at said surface;
fitting a fill foil against said surface, while leaving said openings uncovered;
providing a mandrel (1) having a cylindrical structure similar to the drum (10);
coating the mandrel (1) with a separating medium;
introducing a flowable hardenable casting, or molding compound through said openings from a region of said block-like structure remote from said surface until said casting, or molding compound contacts the mandrel;
and permitting said casting or molding compound to harden to form a seating, or bearing area (17, 18, 19, 20; 21, 22, 23, 24) for the drum which is unvarying with respect to the support structure.

14. Method according to claim 13 wherein the step of introducing said casting or molding compound is carried out under essentially pressure-less conditions.

15. Method according to claim 13 wherein the block further includes bearing means (40, 41) for tape guide rollers;
and further including the step of introducing the bearing sleeve liner compound into said bearing blocks to form a bearing sleeve liner (42, 43).

16. Method according to claim 13 wherein said block-like structure (16) includes locating bores (17, 25) and guide slits (26);

further including the step of introducing core, material into said locating bores and guide slits.

17. Method according to claim 13 wherein said casting or molding material comprises a hardenable, or curable resin.

18. Method according to claim 17 wherein said resin comprises an epoxy resin and a curing or setting agent, curing at room temperature.

19. Method according to claim 17 wherein said resin is dimensionally stable upon setting or curing and is essentially immune with respect to shrinking or expansion upon curing.

20. Method according to claim 17 further including a filler material in said resin.

21. Method according to claim 20 wherein said filler material comprises milled quartz.

22. Method according to claim 21 wherein the proportion of filler material to resin, by weight, is approximately 26% resin and 74% filler material.

23. Method according to claim 13, wherein said block-like structure (16) is made of light-weight metal and the cast or molded material comprises a hardened, or cured resin which is dimensionally stable upon setting or curing and is essentially immune with respect to shrinking or expansion upon curing.

24. Method according to claim 23, further including a filler material in said resin.

* * * * *